(12) United States Patent
Belik

(10) Patent No.: US 7,132,127 B2
(45) Date of Patent: Nov. 7, 2006

(54) CENTRIFUGAL APPLICATOR

(75) Inventor: Jaroslav Belik, Pearland, TX (US)

(73) Assignee: National-Oilwell, L.P., Houston, TX (US)

( * ) Notice: Subject to any disclaimer, the term of this patent is extended or adjusted under 35 U.S.C. 154(b) by 408 days.

(21) Appl. No.: 10/346,773

(22) Filed: Jan. 17, 2003

(65) Prior Publication Data

US 2004/0140159 A1    Jul. 22, 2004

(51) Int. Cl.
B05D 7/22    (2006.01)
(52) U.S. Cl. .................. 427/236; 118/317; 118/323
(58) Field of Classification Search ........... 118/317, 118/323, DIG. 10, DIG. 8, DIG. 16; 239/214.15, 239/222; 184/14; 427/236, 239, 240, 287
See application file for complete search history.

(56) References Cited

U.S. PATENT DOCUMENTS

| | | | |
|---|---|---|---|
| 1,988,329 A | 1/1935 | Perkins | 25/38 |
| 2,760,585 A * | 8/1956 | Bergeron | 166/243 |
| 2,810,145 A * | 10/1957 | Forrow | 401/9 |
| 4,268,544 A | 5/1981 | Wallace | 427/264 |
| 4,891,244 A | 1/1990 | Wallace | 427/195 |
| 5,141,774 A * | 8/1992 | Prittinen et al. | 427/236 |
| 5,259,880 A | 11/1993 | Fujita et al. | 118/317 |
| 5,534,060 A | 7/1996 | Johnson | 118/55 |
| 6,001,425 A * | 12/1999 | Stash et al. | 427/430.1 |
| 6,228,169 B1 | 5/2001 | Wallace | 118/308 |
| 6,309,693 B1 | 10/2001 | Wallace et al. | 427/8 |
| 6,638,366 B1 * | 10/2003 | Lammert et al. | 134/33 |

* cited by examiner

Primary Examiner—Brenda A. Lamb
(74) Attorney, Agent, or Firm—Conley Rose, P.C.

(57) ABSTRACT

Methods and apparatus for applying a uniform application of an appropriate quantity of pipe dope to the internal threads of a pipe. In general, the preferred apparatus includes a supply of pipe dope and a centrifugal applicator for evenly applying the pipe dope to internal threads. The system also includes a dosing system to regulate the distribution of pipe dope by dispensing a consistent volume of pipe dope at each application. Potential advantages of the preferred embodiments include the repeatability and consistency of amount of pipe dope on pipe threads (e.g. thickness).

14 Claims, 5 Drawing Sheets

CENTRIFUGAL APPLICATOR

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The invention relates to threaded pipe connections and the like. More particularly, the invention relates to applying a lubricating material, such as pipe dope, to the internal threads of a pipe.

In the oil and gas production industry, threaded pipe connections are often used. Special types of lubricant compositions are used for application between the male and female parts of these threaded tubular connections. The use of a pipe thread dope, or "pipe dope" as it has been called, may be required to provide a more stable joint. Pipe dope is a paste-like material that is applied to clean internal pipe threads just prior to joint assembly and provides three basic benefits to a threaded pipe joint. First, it lubricates the threads to ease assembly. Second, it acts as a sealant that enhances the gas-tightness or fluid-tightness of the resulting joint. And third, it hardens or cures to effectively cement and stabilize the joint.

The process of applying pipe dope has basically not changed since its original utilization. Pipe dope is commonly packaged in tins, or cans, of varying size, so one may purchase a quantity that is appropriate to the task at hand. The common method of applying pipe dope is to acquire a portion of the dope from the tin with the brush, and apply the dope to internal pipe threads by brushing. This method does not, however, assure a uniform application of the dope, either over the threads of one fitting or from joint to joint. Also, the amount of dope used is not regulated or controlled, so too much or too little dope may be used. Each of these situations may compromise the quality, durability, and reliability of the resulting threaded pipe joint. For example, too little pipe dope on the threads may result in increased friction in the threads during spinning, which may cause galling of the threaded surface. Conversely, too much pipe dope on the threads may result in pollution of the system (e.g. excess pipe dope may fall into the drillstring).

In conventional methods, the quality of a threaded pipe joint is highly dependent upon the skill or craftsmanship of the user in applying the pipe dope. Thus, an apparatus to provide a uniform application of an appropriate quantity of pipe dope will greatly benefit the quality of threaded pipe joints.

BRIEF SUMMARY OF THE PREFERRED EMBODIMENTS

The disclosed embodiments overcome the various deficiencies of the prior art by providing a method and apparatus for applying a uniform application of an appropriate quantity of pipe dope to the threads formed on the inside diameter of a pipe. In general, the preferred apparatus includes a supply of pipe dope and a centrifugal applicator for evenly applying the pipe dope to internal threads. The system also includes a dosing system to regulate the distribution of pipe dope by dispensing a consistent volume of pipe dope at each application. Potential advantages of the preferred embodiments include the repeatability and consistency of amount of pipe dope on pipe threads (e.g. thickness).

In one embodiment, an apparatus for applying a uniform coating of pipe dope to the internal threads of a pipe includes a supply of pipe dope, a dosing system adapted to draw a predetermined amount of pipe dope from the supply, and a centrifugal applicator adapted to receive the predetermined amount of pipe dope and adapted to use centrifugal force to apply the dope to the internal pipe threads.

In an alternative embodiment, an apparatus includes a container having the lubricant contained within, a dosing device in fluid communication with the container, an applicator drum in fluid communication with the dosing device, and a motor connected to the applicator drum. The applicator drum preferably has a plurality of holes disposed thereon in a pattern containing at least four rows of holes extending the length of the drum, where the holes in each row are spaced substantially equidistant apart and where the rows are spaced substantially equidistant apart.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

Figure 1:
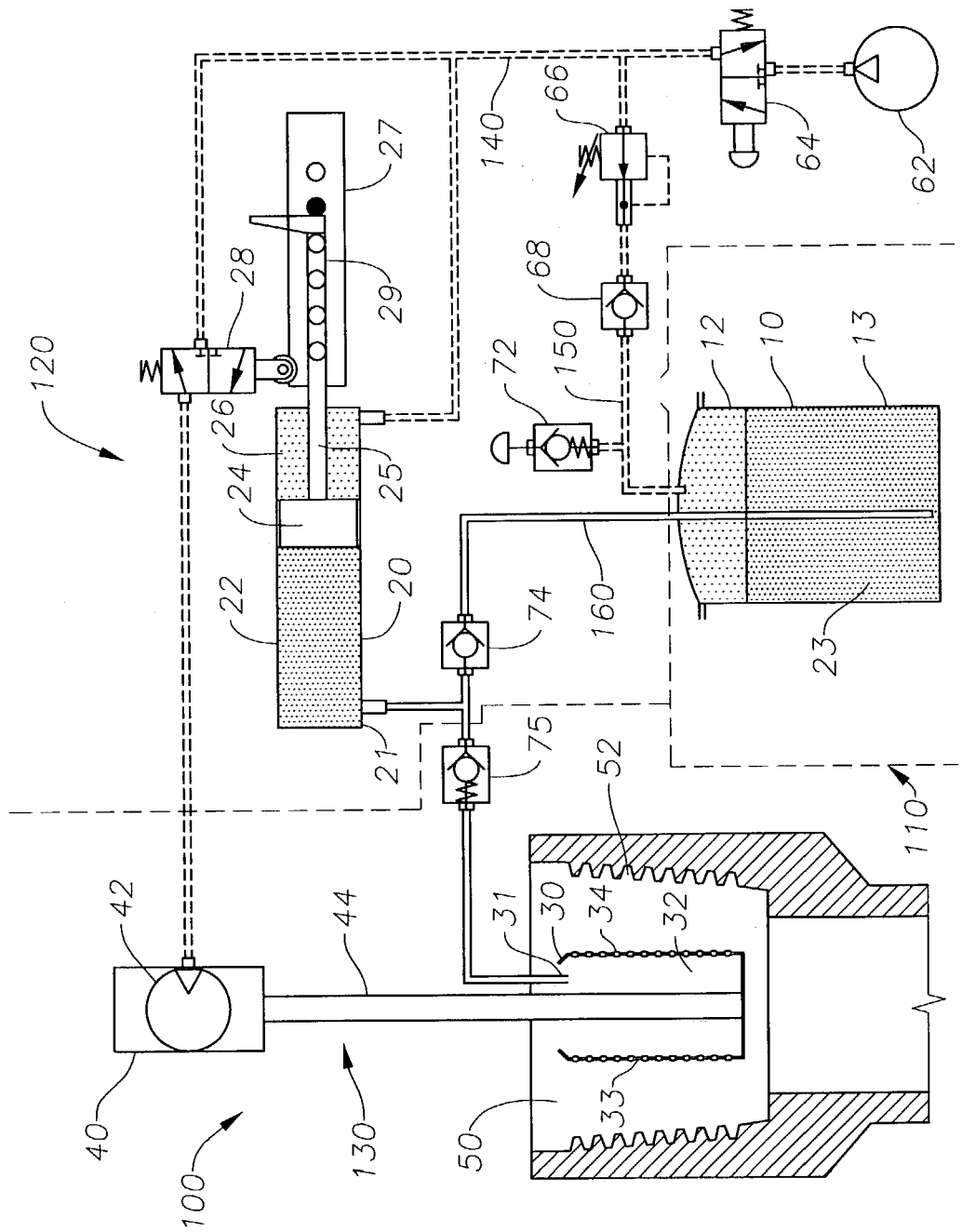
FIG. 1 is a schematic of one embodiment of a lubrication assembly at a first phase of operation.

In the description that follows, like parts are marked throughout the specification and drawings with the same reference numerals, respectively. The drawing figures are not necessarily to scale. Certain features of the preferred embodiments may be shown exaggerated in scale or in somewhat schematic form and some details of conventional elements may not be shown in the interest of clarity and conciseness. The present invention is susceptible to embodiments in different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

In particular, various embodiments of the present invention provide a number of different methods and apparatus for using centrifugal force to apply a viscous material to a cylindrical surface. The concepts of the invention are discussed in the context of applying pipe dope to pipe threads but the use of the concepts of the present invention is not limited to pipe doping applications and may find utility in other coating applications, both within oilfield technology and other areas to which the concepts of the current invention may be applied.

Certain terms are used throughout the following description and claims to refer to particular system components. As one skilled in the art will appreciate, components may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . . " The term "internal threads" refer to the female threads cut into the end of a length of pipe. The terms "lubricant," "pipe thread dope," "pipe dope," and "thread compound" are interchangeable and describe a material that is capable of sealing and/or lubricating a pipe joint. In addition, reference to the terms "left" and "right" are made for purposes of ease of description. It should be appreciated that the scope of the invention is only limited by the claims and not by this description.

Referring initially to FIG. 1, lubrication assembly 100 includes a lubricant supply 110, a dosing system 120, and a centrifugal applicator 130. In general operation, dosing system 120 draws a predetermined amount of lubricant from supply 110. Upon activation, centrifugal applicator 130 takes the predetermined amount of lubricant from supply 110 and distributes the lubricant on internal threads 50. The controlled dosing of the lubricant coupled with the even distribution of lubricant on the threads allows the preferred embodiments to greatly improve the repeatability and consistency of lubricating threaded connections.

Lubrication assembly 100 may be configured for handheld use by a single operator or may preferably be integrated into an automated pipe handling or iron roughneck system so that the threaded connections are automatically lubricated. The preferred assembly may be powered by any convenient power source, such as pneumatic, hydraulic, and electrical power. As an example of one embodiment, lubrication assembly 100 will be described as a handheld, pneumatic system, but it is understood that the embodiment described is not the only embodiment contemplated and the features described may take the form of other embodiments.

FIGS. 1–4 depict one embodiment of an exploded lubrication assembly 100 at four different time points. Referring initially to FIGS. 1 and 5a, lubrication assembly 100 is shown at a first time point prior to lubrication. Lubrication assembly 100 preferably includes a pipe dope container 10, a dosing device 20, a drum 30, and a motor 40. Pipe dope container 10 preferably includes a gas part 12 and a pipe dope part 13 filled with a pipe dope 23. Pipe dope container 10 may be any container suitable for holding pipe dope 23, including, but not limited to, a bucket and a tank. In some embodiments, pipe dope container 10 is pressurized.

Dosing device 20 preferably includes a nozzle 21, a pipe dope side 22, a piston 24, a piston rod 25, a gas part 26, a cam 27, a cam valve 28, and a dose adjust limit pin 29. Cam 27 is preferably located on the end of piston rod 25. As shown in FIG. 1, piston 24 is in an extended position and the stroke, or amount of predetermined pipe dope 23, is limited by dose adjust limit pin 29. In some embodiments, the stroke is varied in order to adjust the amount of pipe dope 23 to be distributed.

Drum 30 preferably includes a collection area 32 and a plurality of distribution holes 34 in its walls 33. Distribution holes 34 are preferably spaced substantially equidistant apart from each other and arranged in rows 36 that span along the width and length of the walls. Preferably, drum 30 has at least 4 rows 36 of ten holes 34. In a preferred embodiment, distribution holes are $\frac{1}{16}$" in diameter and are spaced $\frac{1}{4}$" apart. During lubrication, drum 30 is preferably located in opening 50, surrounded by female pipe threads 52.

Motor 40 is preferably an air motor 42, such as are known in the art and are used for high-speed rotating hand tools such as grinders. Air motor 42 preferably includes a fan (not shown) connected to a shaft 44. Shaft 44 is preferably connected to drum 30.

To better describe the operation of lubrication assembly 100, lubrication assembly 100 can be described as including three circuits, namely: (1) a high pressure gas circuit 140; (2) a low pressure gas circuit 150; and (3) a pipe dope circuit 160. The gas utilized in these circuits is preferably any inert gas or air. The high pressure gas circuit includes a gas supply 62, a trigger valve 64, dosing device 20, motor 40, and a pressure reducing valve 66. Gas supply 62 is preferably connected to trigger valve 64, which is preferably connected to gas side 26 of dosing device 20. Gas side 26 is preferably connected to cam valve 28 through cam 27. Cam valve 28 is preferably connected to air motor 42 and pressure reducing valve 66.

In the low pressure gas circuit, pressure reducing valve 66 is connected to a check valve 68, which is in turn connected to a manual relief valve 72. Manual relief valve 72 is preferably connected to gas part 12 of pipe dope container 10. In a preferred embodiment, manual relief valve 72 is used to release excess pressure in pipe dope container 10.

In the pipe dope circuit, pipe dope part 13 of pipe dope container 10 is connected to a low pressure check valve 74. Low pressure check valve 74 is connected to high pressure check valve 75 and nozzle 21, located on the pipe dope side 22 of dosing device 20.

Figure 2:
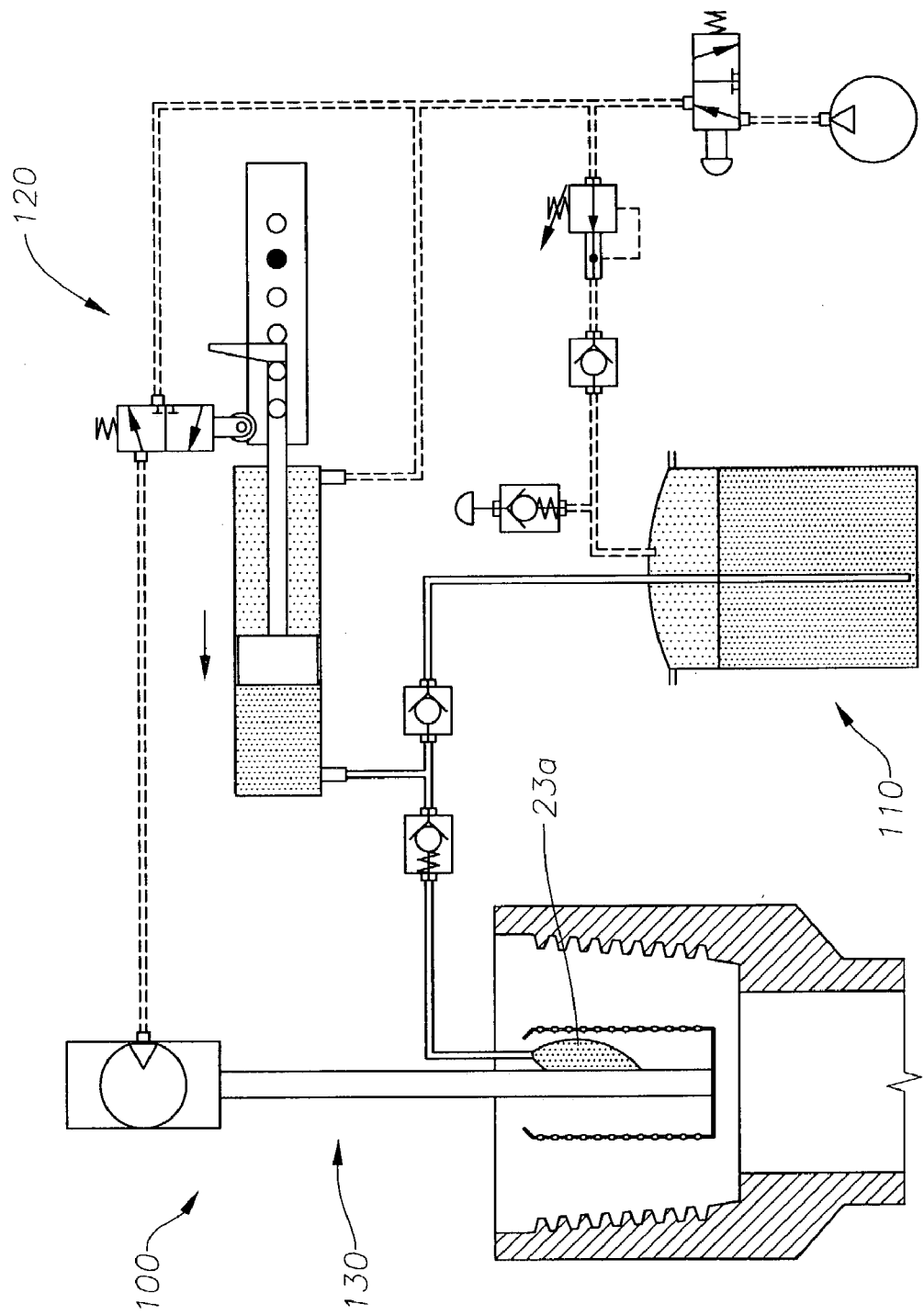
FIG. 2 is a schematic of the lubrication assembly of FIG. 1 at a second phase of operation.
Figure 5A:
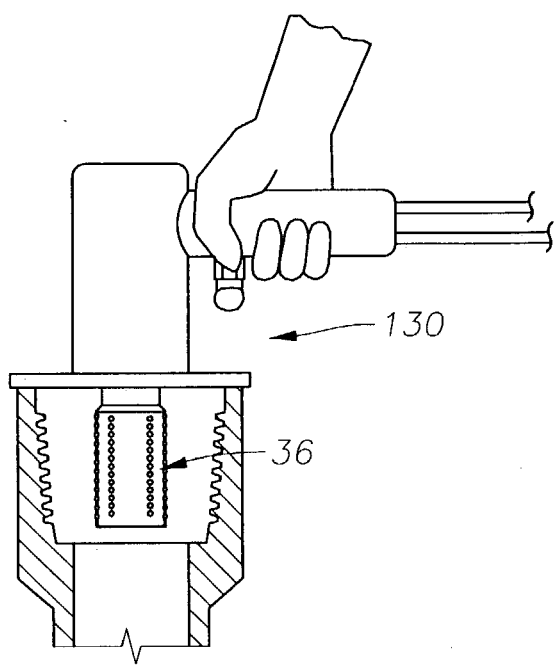
FIGS. 5*a*–5*d* are partial sectional schematics of FIGS. 1–4 illustrating the process of applying lubrication.
Figure 5B:
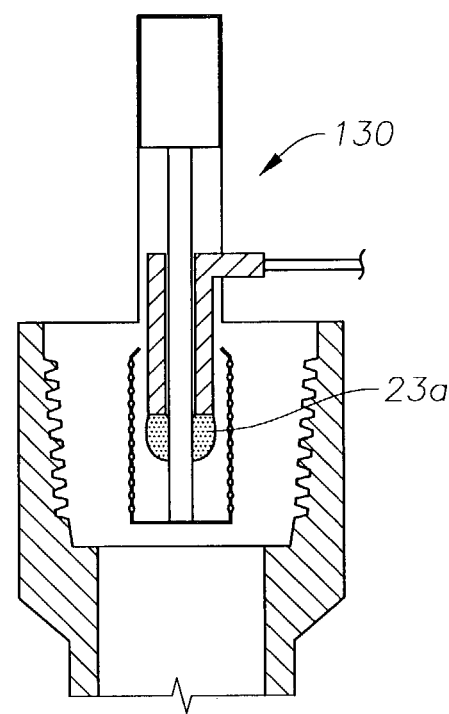

Referring now to FIGS. 2 and 5b, lubrication assembly 100 is shown at a second phase of operation, namely at the beginning of lubrication. In order for lubrication to begin, an operator pushes trigger valve 64 and holds trigger valve 64 for a desired amount of time. This maneuver causes gas pressure to flow into gas side 26 of dosing device 20. Piston 24 creates high pressure in pipe dope side 22 of dosing device 20. High pressure check valve 75 is open, which allows piston 24 to force pipe dope 23 in pipe dope side 22 out of dosing device 20 through nozzle 21. In the present embodiment, piston 24 forces all of pipe dope 23 out of dosing device 20. Pipe dope 23 then preferably passes through high pressure check valve 75 to a drum nozzle 31. Drum nozzle 31 directs pipe dope 23 into collection area 32 of drum 30. As shown in FIGS. 2 and 5b, a pool 23a of pipe dope 23 is formed in collection area 32.

Simultaneously, gas is flowing through pressure reducing valve 66 to gas part 12 of pipe dope container 10. This gas creates a low pressure build up in pipe dope container 10.

Figure 3:
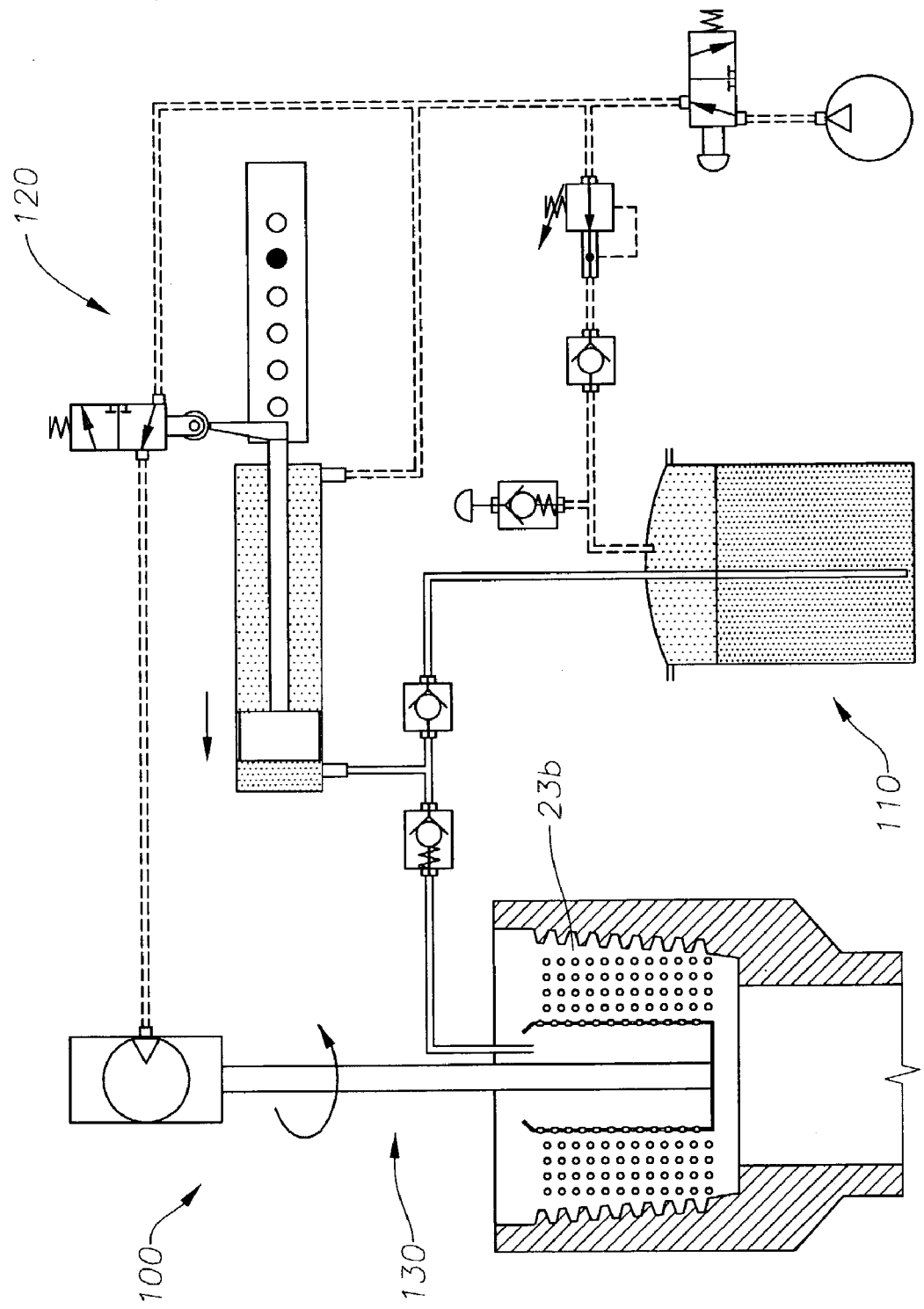
FIG. 3 is a schematic of the lubrication assembly of FIG. 1 at a third phase of operation.
Figure 5C:
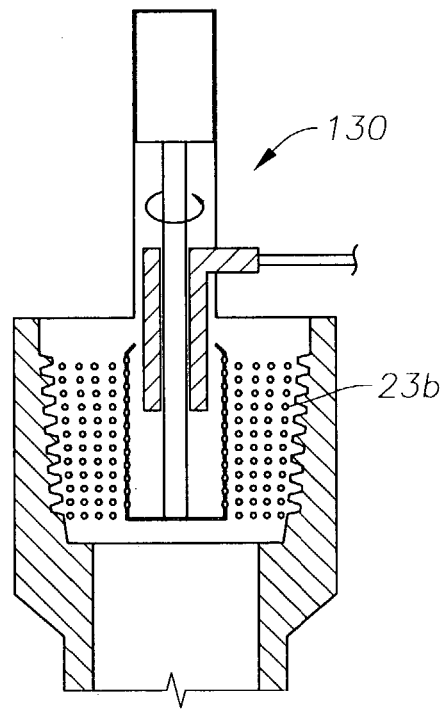

Referring now to FIGS. 3 and 5c, lubrication assembly 100 is shown at a third phase of operation, during application of the lubricant. As piston 24 forces pipe dope 23 out of dosing device 20, piston 24 moves to the left, as indicated by the arrow. Consequently, cam 27 also moves to the left and moves cam valve 28 to its open position. With cam valve 28 open, high pressure gas is allowed to flow to air motor 42. Gas forces the blades of the fan (not shown) to turn, which in turn causes shaft 44 to rotate, as indicated by the arrow. In this embodiment, the speed that shaft 44 rotates is dependent upon a variety of factors including the consistency of pipe dope 23, the size of pipe threads 52, and the distance between lubrication assembly 100 and pipe threads 52.

When shaft 44 rotates, drum 30 rotates and pipe dope 23 is discharged through the plurality of distribution holes 34 via centrifugal force. FIG. 5c shows droplets 23b of pipe dope 23 suspended in opening 50, which will deposit onto the surface of female pipe threads 52.

Figure 4:
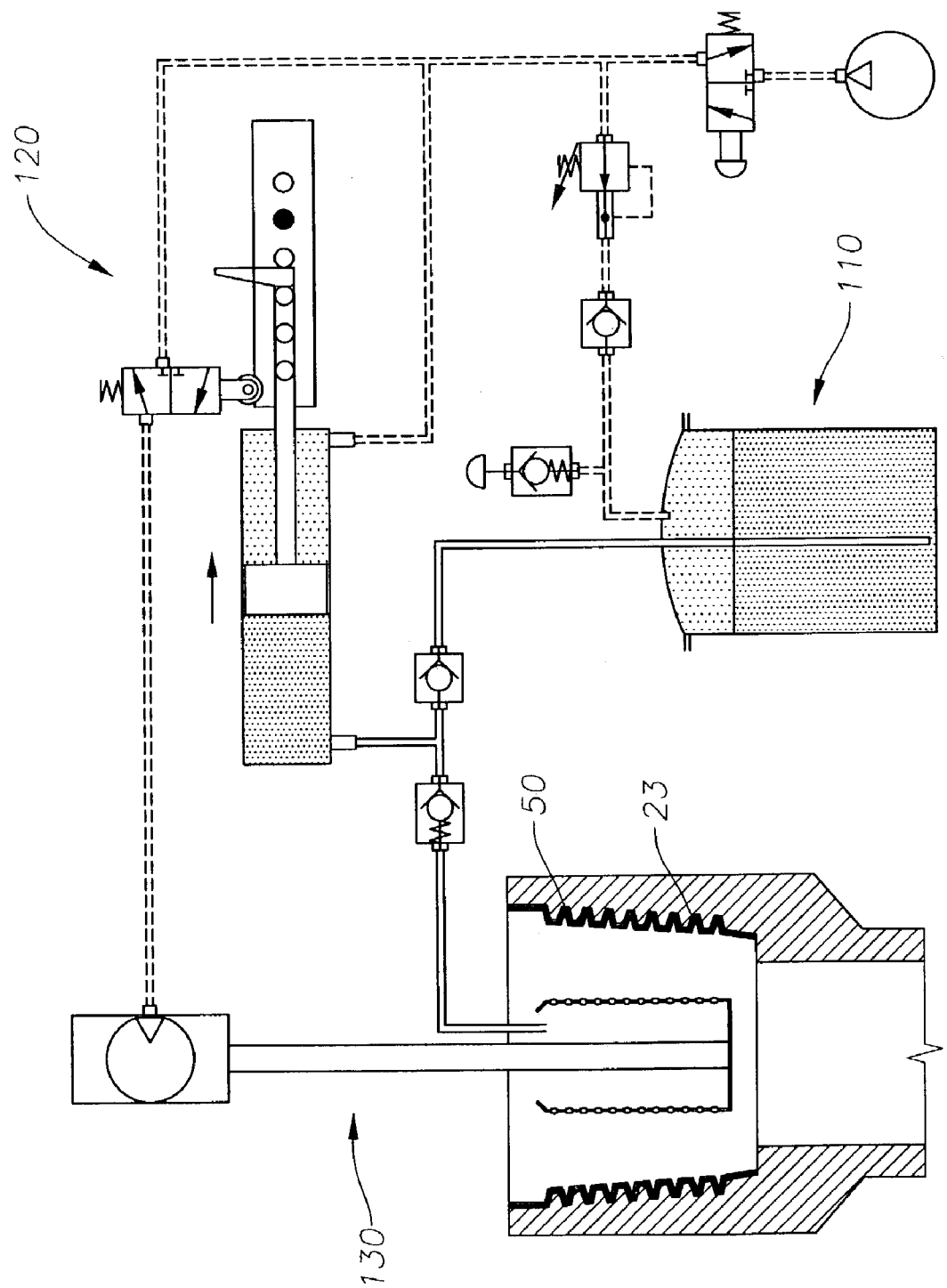
FIG. 4 is a schematic of the lubrication assembly of FIG. 1 at a fourth phase of operation.
Figure 5D:
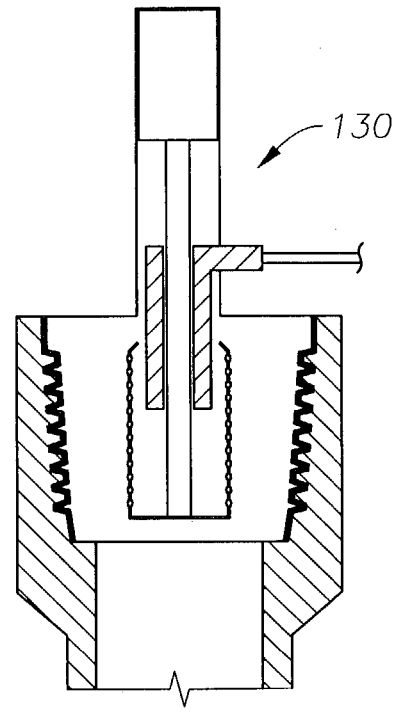

Referring now to FIGS. 4 and 5d, lubrication assembly 100 is shown at a fourth phase of operation, i.e. when lubrication is complete. As shown on FIG. 5d, pipe dope 23 has thoroughly coated the surface of female pipe threads 52. The operator has released trigger valve 64 at this point. Because the gas supply is disconnected, gas pressure from the high pressure circuit is released through trigger valve 64. Air motor 42 subsequently stops rotating. Low gas pressure pushes pipe dope 23 from pipe dope part 13 through low pressure check valve 74 to pipe dope side 22 of dosing device 20. In this embodiment, pipe dope 23 does not flow to drum 30 because high pressure check valve 75 does not open by low pressure. The pipe dope 23 flowing into pipe dope side 22 pushes piston 24 to the right (as indicated by the arrow) until piston rod 25 is stopped by dose adjust limit pin 29. During this time, cam 27 preferably releases cam valve 28 to its closed position.

While the lubrication assembly of the present invention has been described in terms of a manually operated device, the lubrication assembly may alternately be machine operated, e.g. by a robotic arm. A potential benefit of having the device be machine operated is that the operator does not need to be on the drill floor during lubrication; rather, the operator may control the lubrication from a remote location. For example, a lubrication assembly could be integrated into an automatic pipe handling or pipe racking system so that the pipe joints are automatically lubricated as they are being moved into position on the drill floor. Similarly, a lubrication assembly could be integrated into a top drive system so that the pipe joint can lubricated as pipe is being run into the hole. Systems such as these could eliminate the need for personnel either on the drill floor or the monkey board applying lubricant to pipe joints during operations.

While the invention is susceptible to various modifications and alternative forms, specific embodiments thereof are shown by way of example in the drawings and description. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

What is claimed is:

1. An apparatus for applying a lubricant to the internal bore of a pipe comprising:
    a container having the lubricant contained within;
    a dosing device in fluid communication with said container;
    a drum in fluid communication with said dosing device, said drum having a plurality of holes therethrough; and
    a motor connected to said drum,
    wherein the plurality of holes through said drum are in a pattern containing at least four rows of holes extending along the length of the drum, wherein the holes in each row are spaced substantially equidistant apart.

2. The apparatus of claim 1 wherein the rows are spaced substantially equidistant apart about the circumference of said drum.

3. The apparatus of claim 1 wherein said motor is a pneumatic motor.

4. The apparatus of claim 1 wherein the lubricant is moved from said container to said dosing device and to said drum by pneumatic power.

5. The apparatus of claim 1 wherein said container includes lubricant and pressurized air supplied from an air source.

6. An apparatus for applying a lubricant to the internal bore of a pipe comprising:
    a container having the lubricant contained within;
    a dosing device in fluid communication with said container;
    a drum in fluid communication with said dosing device, said drum having a plurality of holes therethrough; and
    a motor connected to said drum, wherein said container includes lubricant and pressurized air supplied from an air source; and
    wherein said dosing system includes a pneumatic cylinder including a limit pin adapted to limit the stroke of said cylinder, wherein the pressurized air in said container forces lubricant into said cylinder.

7. The apparatus of claim 6 wherein said motor is a pneumatic motor.

8. The apparatus of claim 7 further comprising a trigger valve adapted to regulate the flow of pressurized air from the air source to the pneumatic cylinder and the pneumatic motor such that substantially all of the lubricant is moved by the pneumatic cylinder from said dosing device to said drum before the pneumatic motor is activated to rotate said drum.

9. An apparatus for applying a lubricant to the internal bore of a pipe comprising:
    a supply of pipe dope;
    a dosing system adapted to draw a predetermined volume of pipe dope from said supply;
    a centrifugal application system adapted to distribute the predetermined volume of pipe dope to the internal bore of the pipe, a drum having a plurality of holes therethrough;
    a motor adapted to rotate said drum such that the predetermined volume of pipe dope is distributed through the plurality of holes, wherein said motor is a pneumatic motor; and
    a source of pressurized air, wherein said supply of pipe dope includes a pressurized container including pipe dope and pressurized air,
    wherein said dosing system includes a pneumatic cylinder including a limit pin adapted to limit the stroke of said cylinder, wherein the pressurized air in the container forces lubricant into said cylinder.

10. The apparatus of claim 9 further comprising a trigger valve adapted to regulate the flow of pressurized air from the air source to the pneumatic cylinder and the pneumatic motor such that substantially all of the lubricant is moved by the pneumatic cylinder from said dosing device to said drum before the pneumatic motor is activated to rotate said drum.

11. A method for applying a coating of lubricant on pipe threads comprising:
    placing a predetermined amount of lubricant into a collection area within a drum having a plurality of holes therethrough; wherein the lubricant is placed in the collection area while the drum is stationary disposed within the bore of a pipe having internal pipe threads; and
    rotating said drum at a predetermined speed effective to distribute the lubricant onto the pipe threads through the plurality of holes.

12. The method of claim 11 wherein the predetermined amount of lubricant is placed into the drum by a dosing system adapted to draw a predetermined amount of lubricant from a lubricant supply.

13. The method of claim 11 further comprising:
injecting pressurized air into a lubricant container;
drawing a predetermined volume of lubricant from the lubricant container into a dosing system;
injecting pressurized air into the dosing system; and
placing the dosing system into fluid communication with the drum.

14. The method of claim 13 wherein the drum is rotated using pressurized air.

* * * * *